US009733718B2

(12) United States Patent
Han et al.

(10) Patent No.: US 9,733,718 B2
(45) Date of Patent: *Aug. 15, 2017

(54) DISPLAY APPARATUS AND DISPLAY METHOD THEREOF

(71) Applicant: SAMSUNG ELECTRONICS CO., LTD., Suwon-si (KR)

(72) Inventors: Sang-jin Han, Gunpo-si (KR); Yoo-tai Kim, Yongin-si (KR); Jung-geun Kim, Suwon-si (KR); Seung-dong Yu, Hwaseong-si (KR); Jung-ah Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

This patent is subject to a terminal disclaimer.

(21) Appl. No.: 14/587,186

(22) Filed: Dec. 31, 2014

(65) Prior Publication Data
US 2015/0109205 A1 Apr. 23, 2015

Related U.S. Application Data

(63) Continuation of application No. 13/555,479, filed on Jul. 23, 2012, now Pat. No. 8,947,488.

(30) Foreign Application Priority Data

Oct. 7, 2011 (KR) ........................ 10-2011-0102603

(51) Int. Cl.
*H04N 7/14* (2006.01)
*G06F 3/01* (2006.01)
(Continued)

(52) U.S. Cl.
CPC ............ *G06F 3/017* (2013.01); *H04N 5/4403* (2013.01); *H04N 7/141* (2013.01); *H04N 7/15* (2013.01);
(Continued)

(58) Field of Classification Search
CPC ................. H04N 7/15; H04N 21/4312; H04N 21/44218; H04N 5/4403; H04N 7/141;
(Continued)

(56) References Cited

U.S. PATENT DOCUMENTS 7,339,604 B1   3/2008   Barraclough et al.
2010/0081475 A1   4/2010   Chiang et al.
(Continued)

FOREIGN PATENT DOCUMENTS

EP     2365420 A2    9/2011
GB     2470634 A    12/2010
(Continued)

OTHER PUBLICATIONS

Communication dated May 7, 2013 issued by the European Patent Office in counterpart European Application No. 12162408.4.
(Continued)

*Primary Examiner* — Melur Ramakrishnaiah
(74) *Attorney, Agent, or Firm* — Sughrue Mion, PLLC

(57) ABSTRACT

A display method includes displaying content on a screen and if a non-contact user motion having directivity is input, analyzing a direction of input non-contact user motion and dividing the screen into plural screens according to the directivity of the non-contact user motion.

16 Claims, 17 Drawing Sheets

(51) Int. Cl.
   *H04N 7/15*      (2006.01)
   *H04N 21/431*    (2011.01)
   *H04N 21/442*    (2011.01)
   *H04N 21/485*    (2011.01)
   *H04N 5/44*      (2011.01)

(52) U.S. Cl.
   CPC ... *H04N 21/4312* (2013.01); *H04N 21/44218* (2013.01); *H04N 21/4858* (2013.01); *H04N 2005/4432* (2013.01)

(58) Field of Classification Search
   CPC .......... H04N 21/485; H04N 2005/4432; G06F 3/017
   USPC .............................. 348/14.01–14.16; 345/156
   See application file for complete search history.

(56) References Cited

U.S. PATENT DOCUMENTS

| | | |
|---|---|---|
| 2010/0295782 A1 | 11/2010 | Binder |
| 2011/0058011 A1 | 3/2011 | Kim |
| 2011/0107272 A1 | 5/2011 | Aguilar |
| 2011/0148926 A1 | 6/2011 | Koo et al. |
| 2011/0194488 A1* | 8/2011 | Kuo ............... H04L 12/2809 370/328 |
| 2011/0298827 A1 | 12/2011 | Perez |
| 2012/0268372 A1* | 10/2012 | Park ..................... G06F 3/017 345/158 |
| 2013/0039409 A1 | 2/2013 | Gupta |
| 2013/0176232 A1* | 7/2013 | Waeller ................ B60K 35/00 345/173 |

FOREIGN PATENT DOCUMENTS

| | | |
|---|---|---|
| JP | 2005286972 A | 10/2005 |
| KR | 1020090093309 A | 9/2009 |
| WO | 0139498 A2 | 5/2001 |

OTHER PUBLICATIONS

Communication dated Mar. 13, 2017 by the European Patent Office in counterpart European Patent Application No. 12162408.4.

* cited by examiner

DISPLAY APPARATUS AND DISPLAY METHOD THEREOF

CROSS-REFERENCE TO RELATED APPLICATION

This application is a continuation application of U.S. patent application Ser. No. 13/555,479 filed in the U.S. Patent and Trademark Office on Jul. 23, 2012, which claims priority under 35 U.S.C. §119(a) to Korean Patent Application No. 10-2011-0102603, filed on Oct. 7, 2011, in the Korean Intellectual Property Office, the disclosures of which are incorporated herein by reference in their entireties.

BACKGROUND

1. Field

The present disclosure relates to a display apparatus and a display method thereof, and more particularly to a display apparatus and a display method thereof, which can be controlled through user motion.

2. Description of the Related Art

Recently, TVs that adopt a Picture In Picture (PIP) function for displaying a sub picture in a main picture have been commercialized.

However, if it is intended to enter into a PIP-related menu or to adjust the size of a PIP picture in a system that is provided with a typical TV and a remote controller, a complicated procedure, such as operating of the remote controller several times, is required. Accordingly, from a user's point of view, it is inconvenient to operate the PIP function, and this takes a lot of time.

For example, it is required for a user to perform screen division through remote control operations several times, such as an operation for entering into a corresponding mode through a remote controller, an operation for dividing the screen in the corresponding mode, an operation for subsequent selection according to a screen division type or the number of divided screens, and the like.

On the other hand, there have been increasing attempts to implement diverse functions through mounting a camera on a TV. For example, although a technique of controlling the operation of a TV according to motion recognition through a camera has been proposed, there is a limit in performing a control operation according to the motion recognition through the camera. For example, only control operations according to basic TV functions, such as channel up/down and volume up/down, become possible.

SUMMARY

An aspect of the present disclosure provides a display apparatus and a display method thereof, which can divide a screen into plural screens according to user motion.

According to an aspect of the present disclosure, a display method includes displaying content on a screen; and if a user motion having directivity is recognized, dividing the screen into plural screens according to the directivity of the user motion.

The display method may further include displaying the content on a first screen among the plural divided screens, and displaying a captured image of an object on a second screen among the plural divided screens.

The display method may further include, displaying the content on a first screen among the plural divided screens, and displaying captured images of different objects on remaining plural screens of the plural divided screens, respectively.

The display method may further include, displaying the content on a first screen among the plural divided screens, and displaying captured images of an object which are captured in different time zones on remaining plural screens of the plural divided screens, respectively.

Here, the captured image of the object may be at least one of a background-removed image from which a background of the object has been removed and a silhouette image for displaying only a silhouette of the object.

The dividing the screen into plural screens may include, if the directivity of the user motion is vertical, dividing the screen into a left screen and a right screen, and if the directivity of the user motion is horizontal, dividing the screen into an upper screen and a lower screen.

The display method may further include, if a following user motion having directivity is recognized in a state where the screen has been divided into the plural screens, dividing the plural divided screens according to directivity of the following user motion.

In this case, the user motion may be input through at least one of a depth camera and a color camera.

The display method may further include converting the content, which is output through one of the divided screens according to a user command, into a still image; and enlarging and displaying a specified portion of the converted still image.

The display method may further include displaying a user's captured image for video calling on a first screen among the plural divided screens, and displaying a captured image of an opposite party for video calling on a second screen among the plural divided screens.

According to another aspect of the present disclosure, a display unit that displays content on a screen; and a control unit that divides the screen into plural screens according to directivity of a user motion if the user motion having the directivity is recognized.

The control unit may display the content on a first screen among the plural divided screens, and displays a captured image of an object on a second screen among the plural divided screens.

The content may be displayed on a first screen among the plural divided screens and captured images of different objects are displayed on remaining plural screens of the plural divided screens, respectively.

The content may be displayed on a first screen among the plural divided screens and captured images of an object which are captured in different time zones are displayed on remaining plural screens of the plural divided screens, respectively.

Here, the captured image of the object may be at least one of a background-removed image from which a background of the object has been removed and a silhouette image for displaying only a silhouette of the object.

The control unit may divide the screen into a left screen and a right screen if the directivity of the user motion is vertical, and divides the screen into an upper screen and a lower screen if the directivity of the user motion is horizontal.

The control unit may divide the plural divided screens according to directivity of a following user motion if the following user motion is recognized in a state where the screen has been divided into the plural screens.

The control unit may convert the content, which is output through one of the divided screens according to a user command, into a still image, enlarge and display a specified portion of the converted still image.

The control unit may capture a user's captured image for video calling on a first screen among the plural divided screens, and displays a captured image of an opposite party for video calling on a second screen among the plural divided screens.

In this case, the user motion may be input through at least one of a depth camera and a color camera.

BRIEF DESCRIPTION OF THE DRAWINGS

The above and other aspects of the present disclosure will be more apparent from the following detailed description when taken in conjunction with the accompanying drawings, in which.

DETAILED DESCRIPTION OF EXEMPLARY EMBODIMENTS

Hereinafter, exemplary embodiments of the present disclosure are described in detail with reference to the accompanying drawings.

Figure 1:
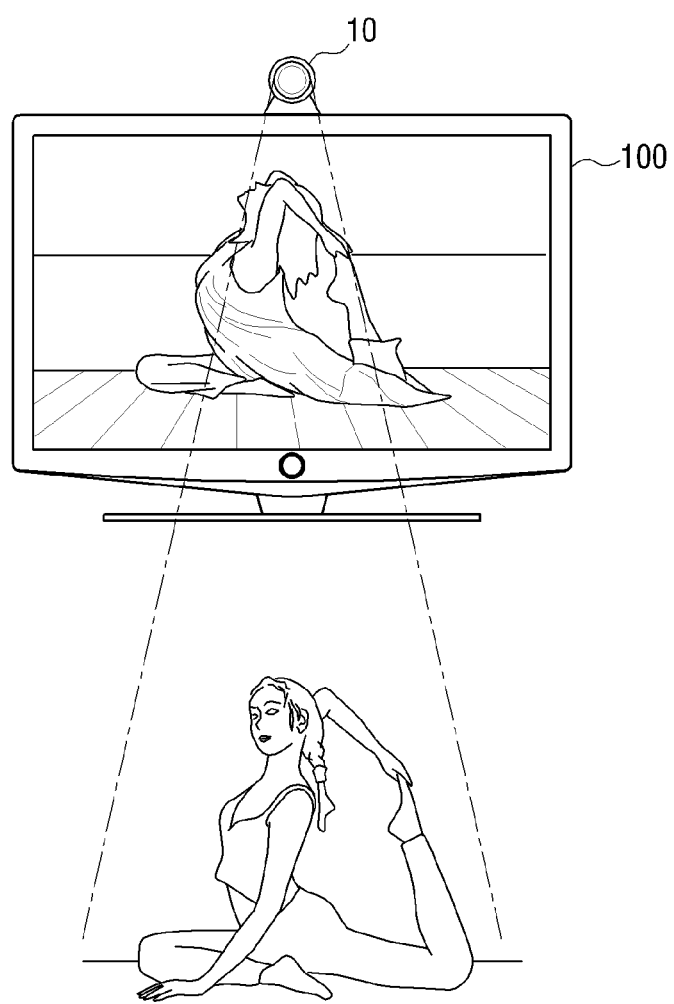
FIG. 1 is a view illustrating the configuration of a display system according to an exemplary embodiment of the present disclosure.

FIG. 1 is a view illustrating the configuration of a display system according to an exemplary embodiment of the present disclosure.

According to FIG. 1, a display system may include a display apparatus 100 and an image capturing device 10.

The display apparatus 100 may be implemented by a digital TV, and according to circumstances, the display apparatus 100 can be implemented by all displayable devices, such as a mobile communication terminal, a mobile phone, a Personal Digital Assistant (PDA), a smart phone, a Digital Multimedia Broadcasting (DMB) phone, an MP3 player, a portable television receiver, and a digital camera.

The image capturing device 10 may be implemented in the form that includes at least one of a depth camera and a color camera. Here, the depth camera may recognize a user motion, and the color camera may recognize hand gestures, for example, whether a user clenches his/her fist or opens his/her hand. On the other hand, the depth camera may be implemented to compensate for a captured image according to a distance (depth) from the camera, and the compensation type may be image enlargement/reduction, resolution adjustment, or the like.

The image capturing device 10 can capture a user motion for controlling the display apparatus 100 and a motion of an object. It is also possible to implement an image capturing device for capturing a user motion and an image capturing device for capturing a motion of an object as separate devices.

On the other hand, in the illustrated embodiment, it is exemplified that the image capturing device 10 is configured separately from the display device 100 (external camera). However, this is merely exemplary, and the image capturing device 10 may be provided inside the display apparatus 100 (built-in camera).

Hereinafter, for convenience in explanation, it is assumed that the image capturing device 10 is provided separately from the display apparatus 100.

Figure 2A:
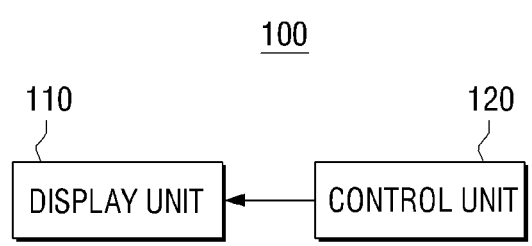
FIG. 2A is a block diagram illustrating the configuration of a display apparatus according to an exemplary embodiment of the present disclosure.

FIG. 2A is a block diagram illustrating the configuration of a display apparatus according to an exemplary embodiment of the present disclosure.

Referring to FIG. 2A, the display apparatus 100 includes a display unit 110 and a control unit 120.

The display unit 110 displays predetermined content on a screen.

Here, the display unit 110 may be implemented by a liquid crystal display panel, a plasma display panel, a Vacuum Fluorescent Display (VFD), a Field Emission Display (FED), an Electro Luminescence Display (ELD), or the like.

The control unit 120 controls the entire operation of the display apparatus 100.

Particularly, if a user motion having directivity is recognized, the control unit 120 may divide the screen into plural screens according to the directions of the user motion.

That is, if the user motion is a motion that moves upward and downward, the control unit 120 divides the screen into a left screen and a right screen, while if the user motion is a motion that moves left and right, the control unit 120 divides the screen into an upper screen and a lower screen.

Further, the control unit 120 may display the specified content on a first screen that is one of the plural divided screens, and display a captured image of an object on a second screen that is another of the plural divided screens. For example, the specified content may be a reference video content, and the captured image of the object may be a captured image that is obtained by capturing the motion of the object that follows the motion of the object included in the reference video content.

Here, the user motion may be recognized through the built-in or external camera. The built-in or external camera may be at least one of a depth camera and a color camera.

On the other hand, a scenario to which the present disclosure is applied may be, for example, a scenario for a user to enter into a motion-learning mode to follow the motion of an object on the specified content during viewing of the content.

If the screen is divided into three or more screens, the control unit 120 may display the specified content on a first screen that is one of the plural divided screens and display captured images of different objects on the remaining screens of the plural divided screens, respectively.

According to the above-described scenario, plural users can utilize the motion-learning mode together.

Further, if the screen is divided into three or more screens, the control unit 120 may display the specified content on a first screen that is one of the plural divided screens and display captured images of an object, which are captured in different time zones, on the remaining screens of the plural divided screens, respectively.

According to the above-described scenario, plural users can utilize the motion-learning mode together.

In this case, the captured image of the object may be at least one of a background-removed image from which a background of the object has been removed and a silhouette image for displaying only the silhouette of the object. Further, the captured image of the object may be an image in which the background-removed image and the silhouette image are combined with each other.

On the other hand, the control unit 120 may additionally divide the plural divided screens according to the directions of a following user motion if the following user motion having directivity is recognized in a state where the screen has been divided into the plural screens. For example, if a method that moves left and right is recognized in a state where the screen has been divided into a left screen and a right screen, the left screen and the right screen are divided into an upper screen and a lower screen, respectively, so that the entire screen is divided into four screens.

Further, the control unit 120 may convert the content, which is output through one of the divided screens according to the user command, into a still image, enlarge and display a specified portion of the converted still image. Accordingly, the specified portion of the content can be trimmed and provided.

Figure 2B:
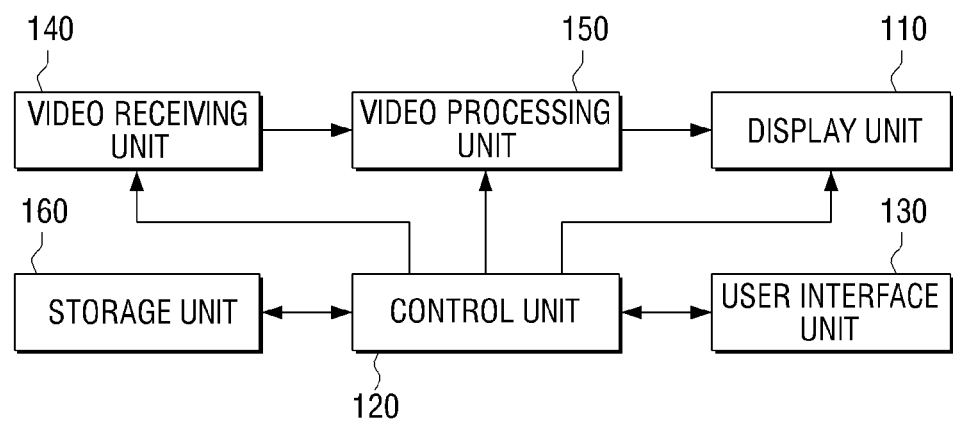
FIG. 2B is a block diagram illustrating the detailed configuration of the display apparatus illustrated in FIG. 2A.

FIG. 2B is a block diagram illustrating the detailed configuration of the display apparatus illustrated in FIG. 2A.

Referring to FIG. 2B, the display apparatus 100 includes a display unit 110, a control unit 120, a user interface unit 130, a video receiving unit 140, a video processing unit 150, and a storage unit 160. With respect to constituent elements illustrated in FIG. 2B, which overlap the constituent elements illustrated in FIG. 2A, the detailed description thereof will be omitted.

The user interface unit 130 receives a user command.

Specifically, the user interface unit 130 receives a user command according to the user motion that is input from an external camera (not illustrated). Here, the user motion may be a motion having directivity.

Further, it is also possible that the user interface unit 130 is implemented by an internal camera (not illustrated) that is provided inside the display apparatus 100. Here, the external camera (not illustrated) or the internal camera (not illustrated) may be implemented by at least one of a depth camera and a color camera. That is, the external camera (not illustrated) or the internal camera (not illustrated) may be implemented by the depth camera or the color camera, and it is also possible to implement the external or internal camera in a combined form of the depth camera and the color camera.

The video receiving unit 140 receives and demodulates a video signal that is received by wire or wirelessly from a broadcasting station or a satellite. Further, the video receiving unit 140 may be connected to an external device such as a camera or a DVD and receive videos from the external device.

The video processing unit 150 performs video decoding, format analysis, signal processing, such as video scaling, and GUI (Graphic User Interface) addition, with respect to the video received through the video receiving unit 140.

The storage unit 160 stores a user command that corresponds to a predetermined motion.

Here, the predetermined motion may be a user motion using one hand on the basis of xyz axes. Here, the z axis may be an axis that is perpendicular to the display apparatus, and the xy plane may be a plane that is parallel to the display apparatus. The setting of coordinate axes, detailed motion types, and corresponding user commands will be described later with reference to the drawings. However, a range that is vertical or horizontal to the display apparatus is not a range that is accurately numerically limited, but may be a range to the extent that can be recognized as the horizontal or vertical range by the user.

Further, the storage unit 160 may have a predetermined storage capacity, and store an image that is captured through the internal or external camera (not illustrated) in a recording medium. In this case, a magnetic recording medium, such as a Hard Disk Drive (HDD) or a semiconductor recording medium such as a memory card or a flash memory, is applicable as a recording medium, and an optical recording medium, such as a Digital Versatile Disk (DVD), is also applicable.

Further, the storage unit 160 may reproduce a captured image that is stored in the recording medium. In this case, the storage unit 160 may include a circular buffer region that provides a time shift function, and the control unit 120 may provide time shift function through control of respective function units.

Here, the time shift function enables a user to view an image captured at a time point that is prior to the current image capturing time point through reproduction of the image captured at the time point that is prior to the current image capturing time point.

This time shift function can be provided by securing a predetermined amount (time) of the previous image through temporary recording of the predetermined amount of the image.

For example, by using the time shift function, the currently captured image is automatically stored in a hard disk as a digital signal, and is reproduced on the screen at the same time. Accordingly, if a "stop" button is pressed and then a "play" button is pressed again, the stored image is reproduced from the time point where the reproduction of the image is stopped. Further, the currently captured image can be viewed again or reproduced in slow motion, and a specified portion may be skipped to find a desired portion of the image.

On the other hand, the control unit 120 determines whether a motion captured through a camera, a hand gesture, or a hand posture corresponds to a predetermined motion that is stored in the storage unit 160, and if so, the control unit 120 may operate to perform a command that corresponds to each motion. Here, the corresponding command may be screen division, picture size adjustment, or the like. The detailed description thereof will be described later with reference to the drawings.

Figure 3A:
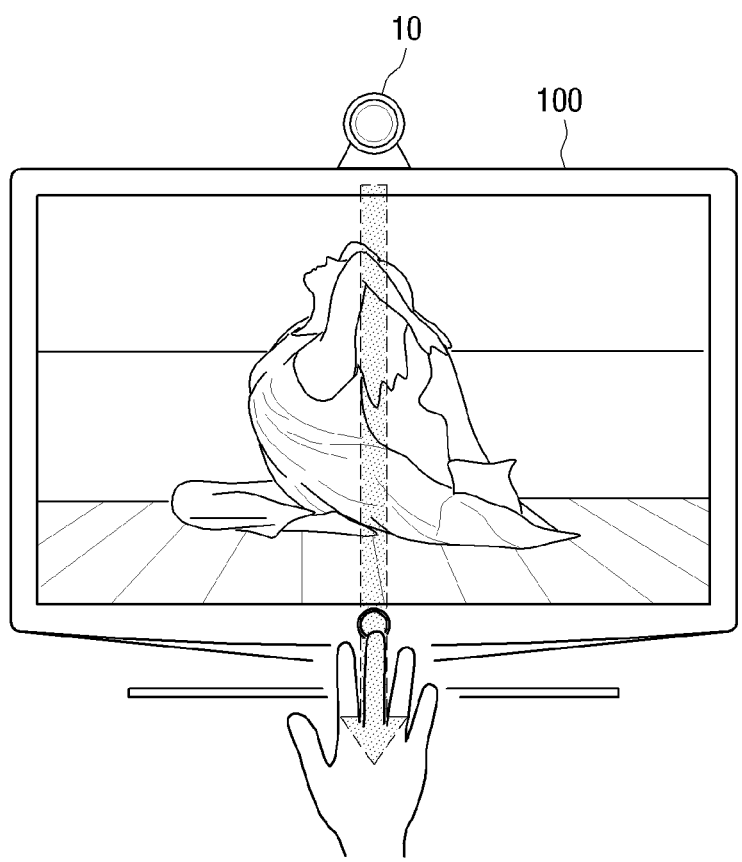
FIGS. 3A and 3B are diagrams illustrating a display method according to an embodiment exemplary of the present disclosure.
Figure 3B:
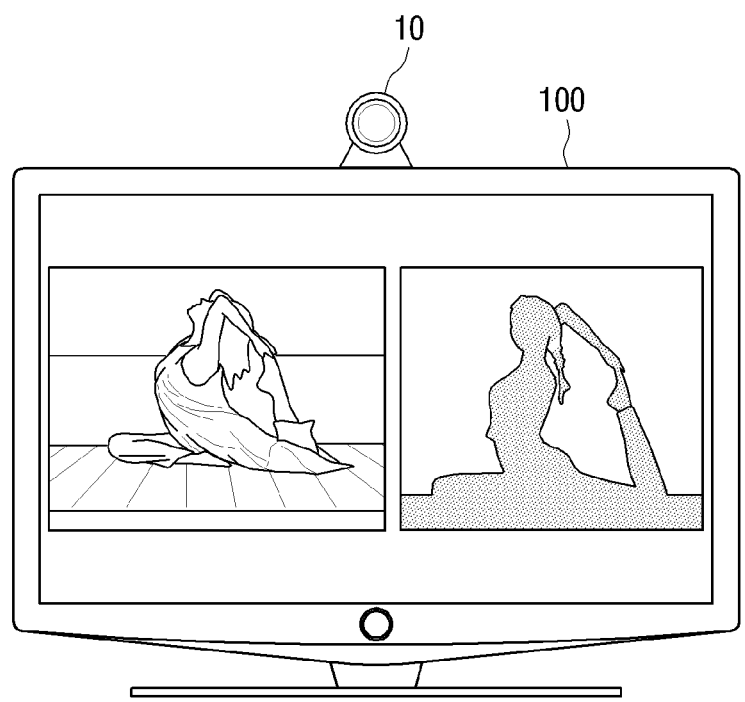

FIGS. 3A and 3B are diagrams illustrating a display method according to an exemplary embodiment of the present disclosure.

FIG. 3A shows a case where a user command is input according to a user motion that crosses a space upward and downward on an xy plane in a state where specified content is displayed on the screen. Here, the specified content may be reference video content.

In this case, as illustrated in FIG. 3B, the divided screens may be displayed in the directions of the user motion, that is, in the same directions as the upward and downward directions. Further, on the divided screens, the specified content which has been displayed and a captured image of an object may be displayed.

Here, if the specified content is reference image content, the captured image of the object may be an image that is obtained by capturing the motion of the object included in the reference image content.

Figure 4A:
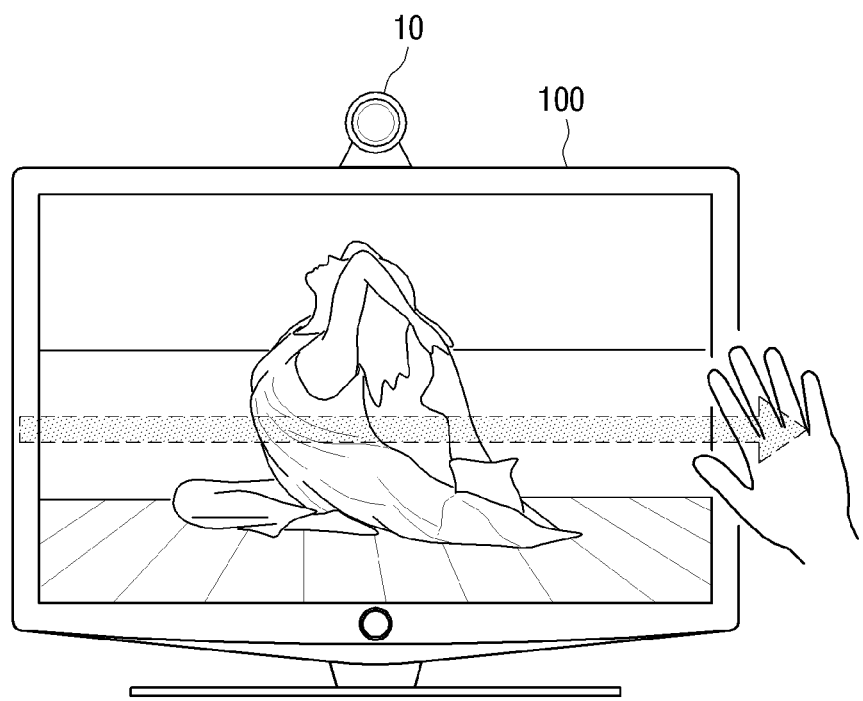
FIGS. 4A and 4B are diagrams illustrating a display method according to another exemplary embodiment of the present disclosure.
Figure 4B:
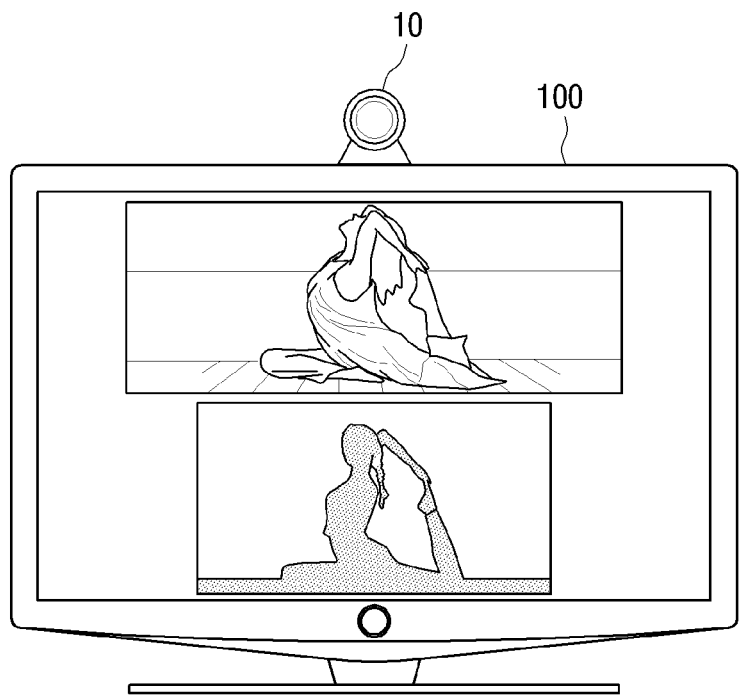

FIGS. 4A and 4B are diagrams illustrating a display method according to another exemplary embodiment of the present disclosure.

FIG. 4A shows a case where a user command is input according to a user motion that crosses a space left and right on an xy plane in a state where first content is displayed on the screen.

In this case, as illustrated in FIG. 4B, the divided screens may be displayed in the directions of the user motion, that is, in the same directions as the left and right directions.

In this case, the reference image content may be displayed on an upper screen, and an image that is obtained by capturing the motion of the object included in the reference image content may be displayed on a lower screen.

Figure 5A:
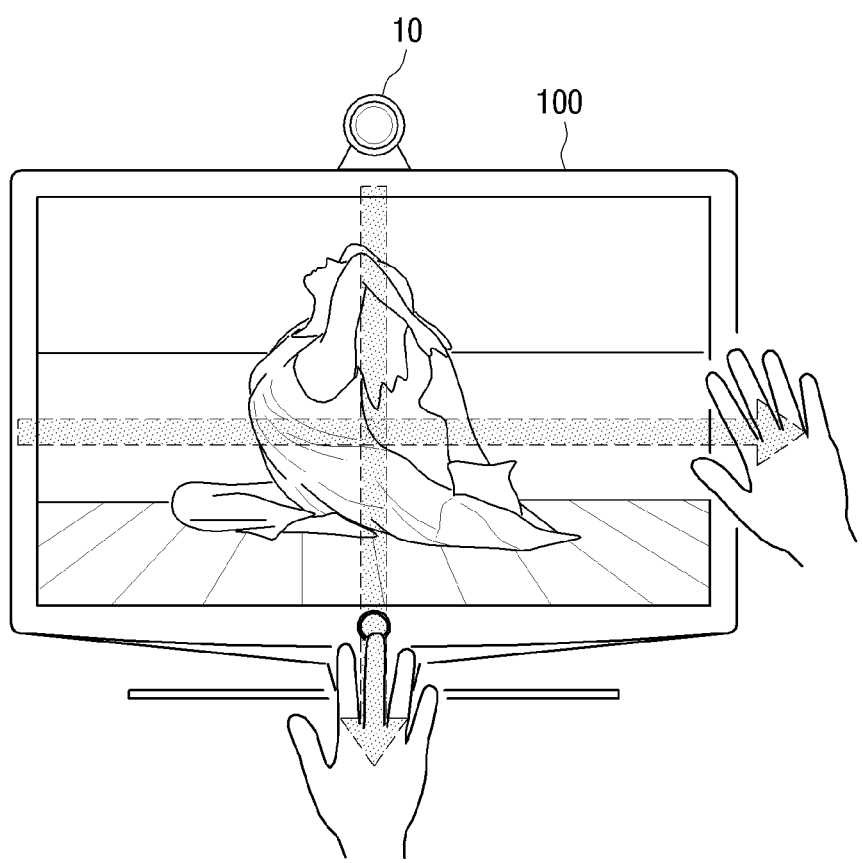
FIGS. 5A to 5C are diagrams illustrating a display method according to still another exemplary embodiment of the present disclosure.
Figure 5B:
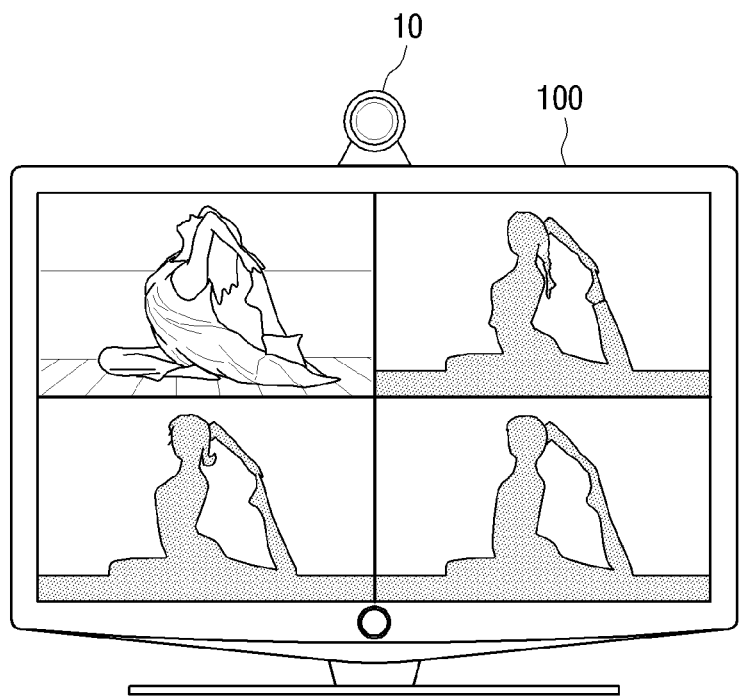
Figure 5C:
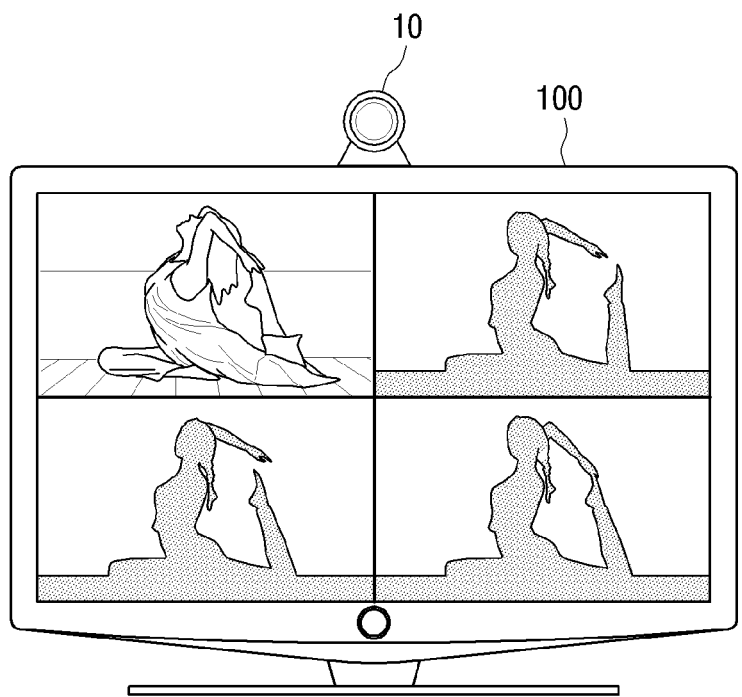

FIGS. 5A to 5C are diagrams illustrating a display method according to still another embodiment of the present disclosure.

FIG. 5A shows a case where a user command is input according to a user motion that crosses a space upward, downward, left, and right in a state where reference image content is displayed on the screen.

In this case, as illustrated in FIG. 5B, the divided screens may be displayed in the directions of the user motion, that is, in the same directions as the upward, downward, left, and right directions. Further, on the divided screens, the reference image content which has been displayed and a plurality of captured images of objects may be displayed.

Here, the plurality of captured images of objects may be the images which are obtained by capturing motions of different objects that follow the motion of the object included in the reference image content.

Further, as illustrated in FIG. 5C, the plurality of captured images of objects may be the images which are obtained by capturing motions of the same object that follows the motion of the object included in the reference image content in different time zones. This can be implemented using the above-described time shift function.

Figure 6A:
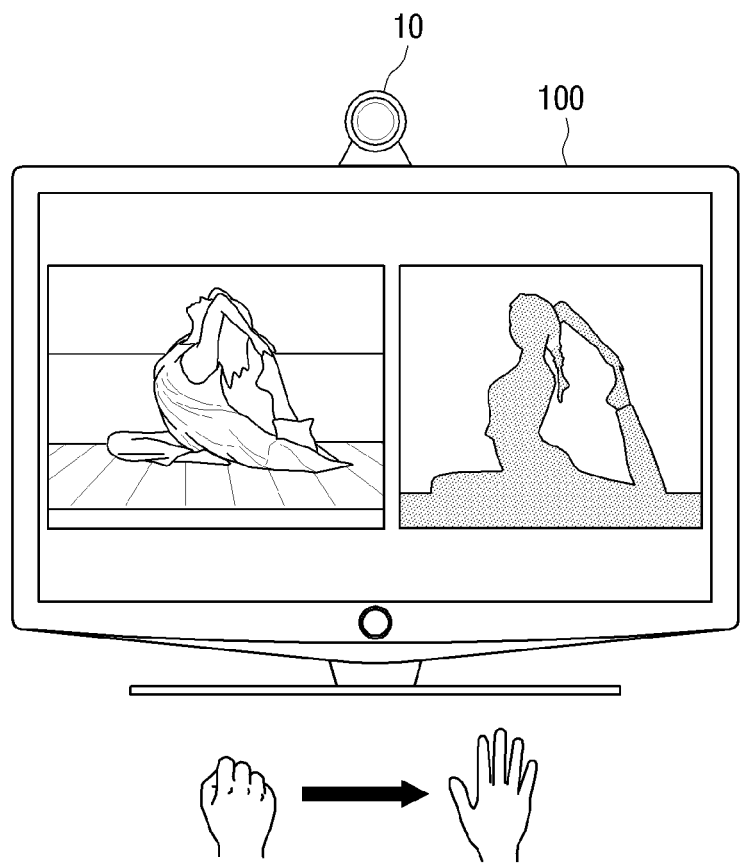
FIGS. 6A to 6C are diagrams illustrating a display method according to still another exemplary embodiment of the present disclosure.
Figure 6B:
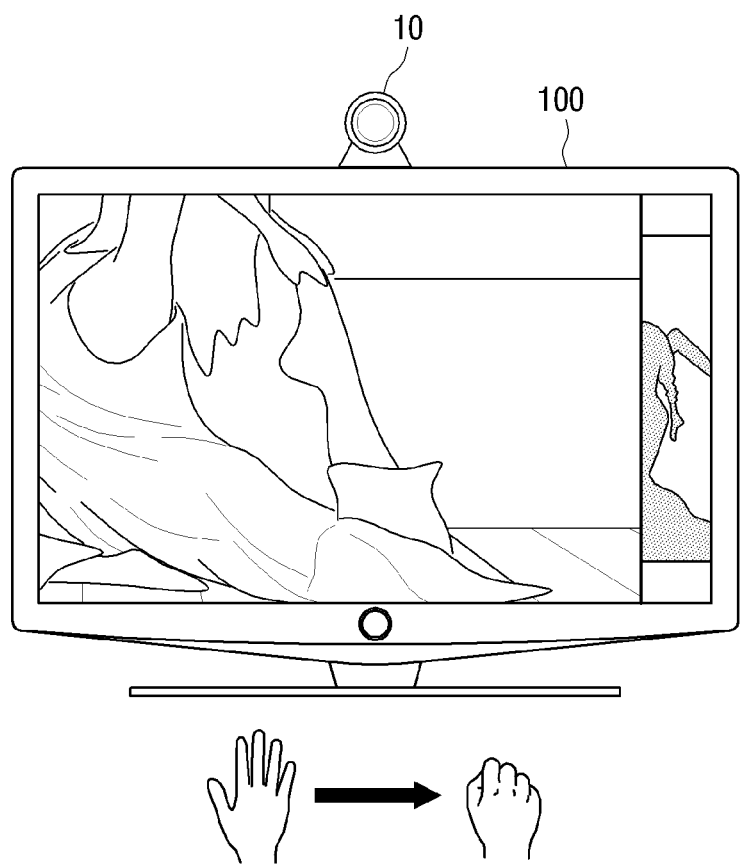
Figure 6C:
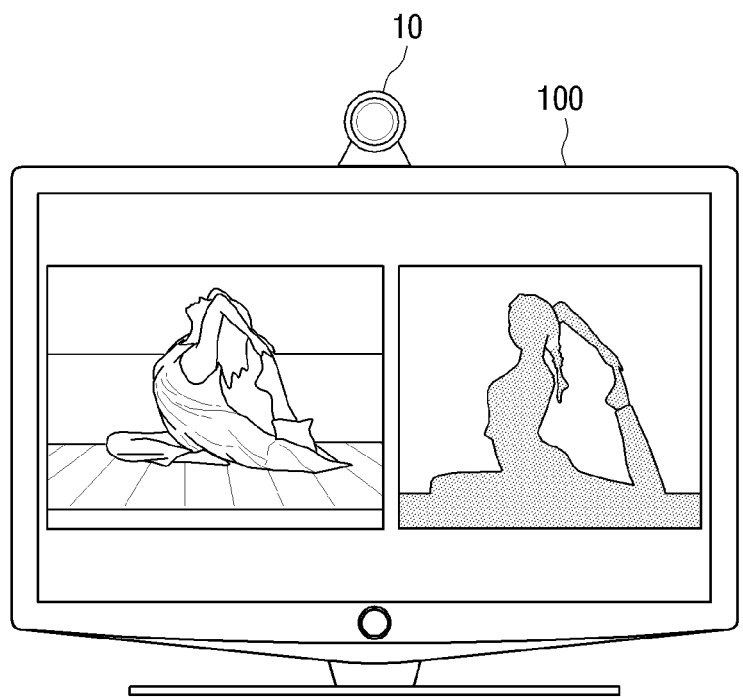

FIGS. 6A to 6C are diagrams illustrating a display method according to still another exemplary embodiment of the present disclosure.

FIG. 6A shows a case where the screen is divided according to the exemplary embodiment illustrated in FIGS. 3A and 3B, and different content are displayed on the divided screens.

If a specified user motion is present in the state illustrated in FIG. 6A, the content that is displayed on one of the divided screens illustrated in FIG. 6B may be converted into a still image, and a specified portion of the converted still image may be enlarged and displayed. For example, the specified motion may be a motion in which a user is opening his/her hand from a state where the user clenches his/her fist. This motion can be implemented to be immediately recognizable simultaneously with the hand opening motion.

If an opposite motion is present in the state illustrated in FIG. 6B, the stopped/enlarged screen may be restored to its original state in FIG. 6C. For example, the opposite motion may be a motion in which a user is clenching his/her fist from a state where the user opens his/her hand. This opposite motion can be implemented to be immediately recognizable simultaneously with the fist clenching motion.

However, the motions illustrated in FIGS. 6A and 6B are merely exemplary, and corresponding functions can be executed through diverse motions, such as a motion in which a user's hand is rotated so as to draw a circle in the left or right direction in a state where the hand is opened, a motion in which a user's hand is pushed in the forward direction in a state where the hand is opened, a motion in which a user's hand is pushed to throw in the forward direction in a state where a finger is in a bent state, and the like.

Figure 7A:
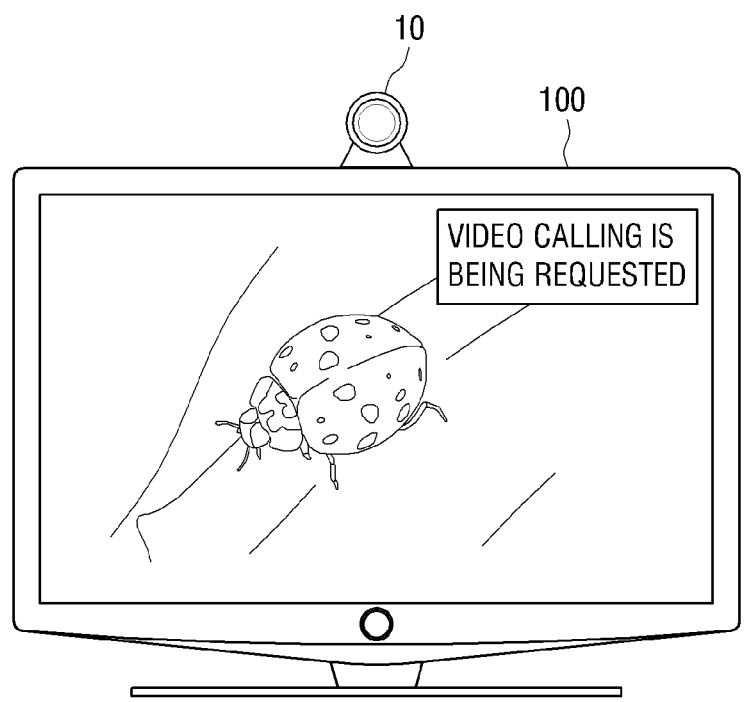
FIGS. 7A to 7C are diagrams illustrating a display method according to still another exemplary embodiment of the present disclosure.
Figure 7B:
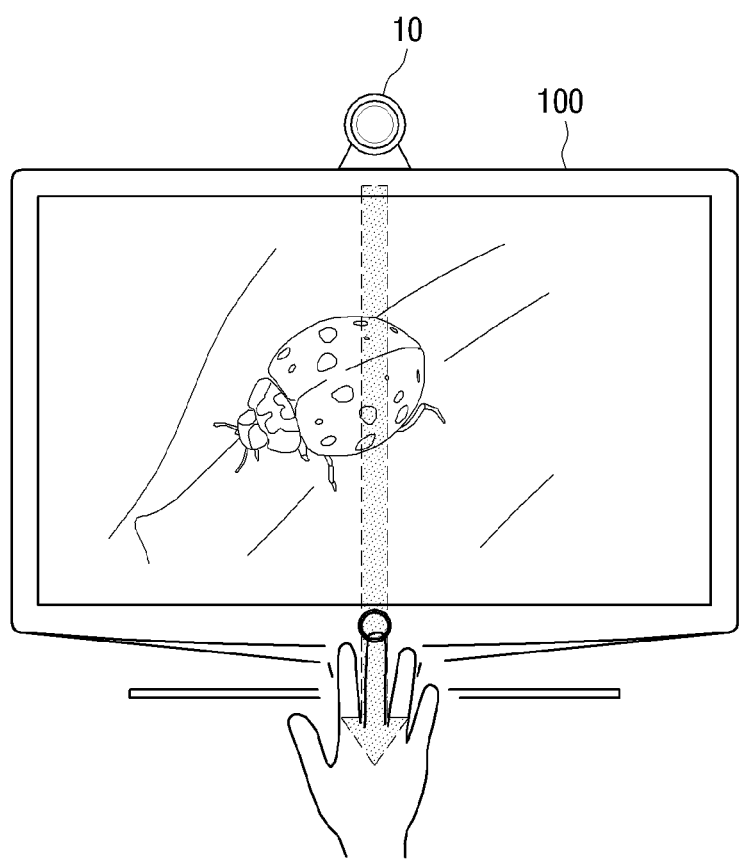
Figure 7C:
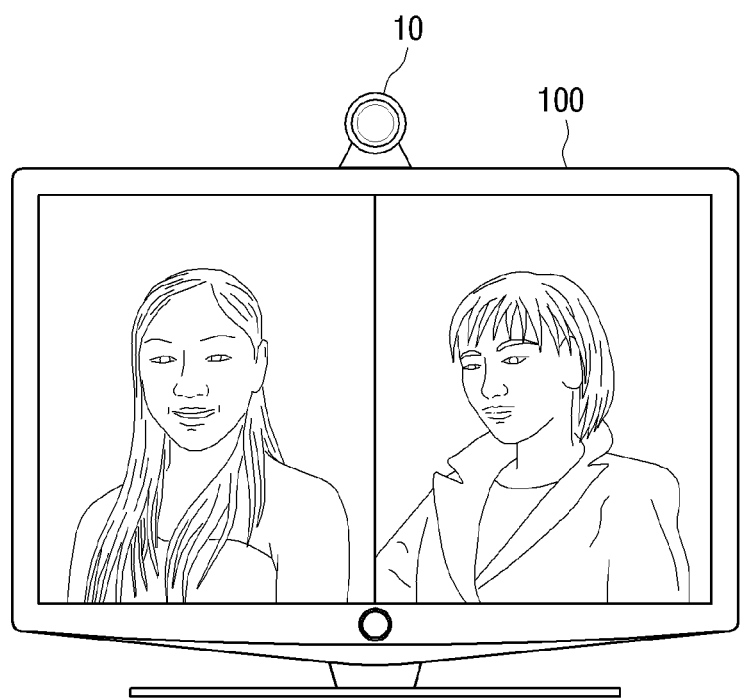

FIGS. 7A to 7C are diagrams illustrating a display method according to still another exemplary embodiment of the present disclosure.

Video call may be requested in a state where predetermined video content is displayed on the screen, as shown in FIG. 7A.

In this case, if a user motion is input, as shown in FIG. 7B, the screen may be divided in the direction of the user motion, that is, in the same direction as the upward/downward direction, as illustrated in FIG. 7C.

In this case, on the divided screens, a user and an opposite party for video calling may be displayed, respectively.

On the other hand, the screen division methods according to the present disclosure are not limited to the above-described learning mode or video calling mode, but can be applied to all scenarios where screen division is required in the display apparatus.

Further, the screen division methods according to the present disclosure can be applied to all scenarios that are applied to the existing PIP function.

Figure 8:
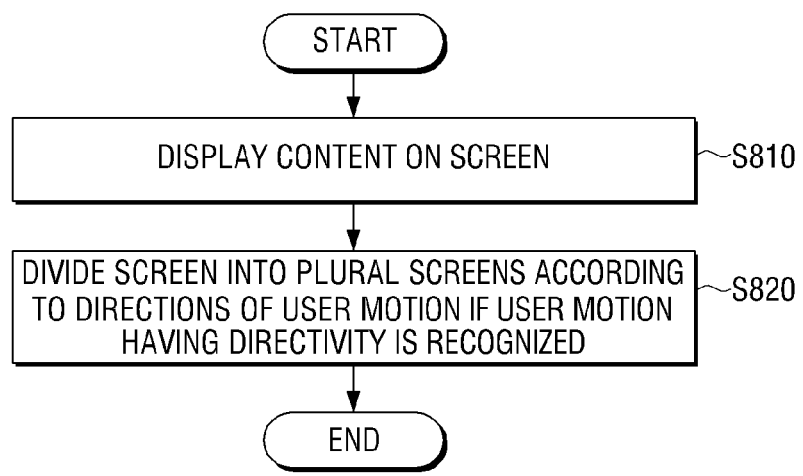
FIG. 8 is a flowchart illustrating a display method according to an exemplary embodiment of the present disclosure.

FIG. 8 is a flowchart illustrating a display method according to an exemplary embodiment of the present disclosure.

According to the display method illustrated in FIG. 8, content is first displayed on the screen (S810).

Then, if a user motion having directivity is recognized, the screen is divided into plural screens according to directions of the user motion (S820). In this case, the user motion may be input through at least one of a depth camera and a color camera.

In this case, the content may be displayed on a first screen that is one of the plural divided screens, and a captured image of an object may be displayed on a second screen that is one of the plural divided screens.

If the screen is divided into three or more screens, the existing content may be displayed on the first screen that is one of the plural divided screens, and captured images of different objects may be displayed on the remaining screens of the plural divided screens, respectively.

Further, if the screen is divided into three or more screens, the existing content may be displayed on the first screen that is one of the plural divided screens, and captured images of an object which are captured in different time zones may be displayed on the remaining screens of the plural divided screens, respectively.

Here, the captured image of the object may be at least one of a background-removed image from which a background of the object has been removed and a silhouette image for displaying only a silhouette of the object.

The step S820 of dividing the screen into plural screens may include dividing the screen into a left screen and a right screen if the user motion is a motion that moves upward and downward, and dividing the screen into an upper screen and a lower screen if the user motion is a motion that moves left and right.

Further, if a following user motion having directivity is recognized, in a state where the screen has been divided into the plural screens, the plural divided screens may be additionally divided according to the directions of the following user motion.

Further, the content, which is output through one of the divided screens according to a user command, may be converted into a still image, and a specified portion of the converted still image may be enlarged and displayed.

Accordingly, a user can enter into a posture helper/motion-learning mode with respect to any content desired by the user during viewing of the content only with a camera attached to a TV without purchasing expensive content or separate equipment.

The exemplary embodiments may be embodied on a storage medium that includes a program for executing the display method according to the present disclosure as described above, that is, a computer readable recording medium. Here, the computer readable recording medium includes all kinds of recording devices in which data that can be read by a computer system is stored. Examples of computer readable recording medium may include a ROM, a RAM, a CD-ROM, a magnetic tape, a floppy disk, and an optical data storage device. The computer readable recording medium may be distributed to computer systems connected through a network, and codes that can be read by a computer in a distribution method may be stored and executed in the computer readable recording medium.

The exemplary embodiments may be embodied by an apparatus that includes a bus coupled to every unit of the apparatus, at least one processor (e.g., central processing unit, microprocessor, etc.) that is connected to the bus for controlling the operations of the apparatus to implement the above-described functions and executing commands, and a memory connected to the bus to store the commands, received messages, and generated messages.

As will also be understood by the skilled artisan, the exemplary embodiments, including units and/or modules thereof, may be implemented by any combination of software and/or hardware components, such as a Field Programmable Gate Array (FPGA) or Application Specific Integrated Circuit (ASIC), which performs certain tasks. A unit or module may advantageously be configured to reside on the addressable storage medium and configured to execute on one or more processors or microprocessors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or modules or further separated into additional components and units or modules.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A display method comprising:
   displaying content on a screen; and
   if a non-contact user motion having directivity is input, analyzing a direction of input non-contact user motion and dividing the screen into plural screens corresponding to the directivity of the non-contact user motion,
   wherein the dividing the screen into plural screens comprises, if the directivity of the non-contact user motion corresponds to a first directivity, dividing the screen into a left screen and a right screen, and if the directivity of the non-contact user motion corresponds to a second directivity, dividing the screen into an upper screen and a lower screen.

2. The display method as claimed in claim 1 further comprising receiving the user motion through a control device for controlling a display apparatus.

3. The display method as claimed in claim 2, wherein if a user motion for moving the control device is input, the receiving comprises sensing a directivity of the user motion by the control device and receiving a sensed result from the control device.

4. The display method as claimed in claim 1, further comprising, wherein if a non-contact user motion having directivity is input while a video calling is received, displaying a user's captured image for video calling on a first screen among the plural divided screens, and displaying a captured image of an opposite party for video calling on a second screen among the plural divided screens.

5. The display method as claimed in claim 1, further comprising displaying the content on a first screen among the plural divided screens, and displaying a captured image of an object on a second screen among the plural divided screens.

6. The display method as claimed in claim 1, further comprising, displaying the content on a first screen among the plural divided screens, and displaying captured images of different objects on remaining plural screens of the plural divided screens, respectively.

7. The display method as claimed in claim 1, further comprising displaying the content on a first screen among the plural divided screens, and displaying captured images of an object which are captured in different time zones on remaining plural screens of the plural divided screens, respectively.

8. A display method comprising:
   displaying content on a screen;
   if a non-contact user motion having directivity is input, analyzing a direction of input non-contact user motion and dividing the screen into plural screens according to the directivity of the non-contact user motion; and
   if a following non-contact user motion having directivity is recognized in a state where the screen has been divided into the plural screens, dividing the plural divided screens according to directivity of the following non-contact user motion.

9. A display apparatus comprising:
   a display unit that displays content on a screen;
   a user motion detection unit that receive an input of a non-contact user motion; and
   a control unit that analyzes a direction of an input non-contact user motion and divides the screen into plural screens according to directivity of the input non-contact user motion if the input non-contact user motion having the directivity is recognized,
   wherein the dividing the screen into plural screens comprises, if the directivity of the non-contact user motion corresponds to a first directivity, dividing the screen into a left screen and a right screen, and if the directivity of the non-contact user motion corresponds to a second directivity, dividing the screen into an upper screen and a lower screen.

10. The display apparatus as claimed in claim 9, wherein the user motion detection unit receives the non-contact user motion through a control device for controlling the display apparatus.

11. The display apparatus as claimed in claim 10, wherein if a user motion for moving the control device is input, the control device senses a directivity of the user motion, and the user motion detection unit receives a sensed result from the control device and recognizes the user motion.

12. The display method as claimed in claim 9, wherein if a non-contact user motion having directivity is input while a video calling is received, the control unit displays a user's captured image for video calling on a first screen among the plural divided screens, and displays a captured image of an opposite party for video calling on a second screen among the plural divided screens.

13. The display apparatus as claimed in claim 9, wherein the control unit displays the content on a first screen among the plural divided screens, and displays a captured image of an object on a second screen among the plural divided screens.

14. The display apparatus as claimed in claim 9, wherein the content is displayed on a first screen among the plural divided screens and captured images of different objects are displayed on remaining plural screens of the plural divided screens, respectively.

15. The display apparatus as claimed in claim 9, wherein the content is displayed on a first screen among the plural divided screens and captured images of an object which are captured in different time zones are displayed on remaining plural screens of the plural divided screens, respectively.

16. A display apparatus comprising:
a display unit that displays content on a screen;
a user motion detection unit that receive an input of a non-contact user motion; and
a control unit that analyzes a direction of an input non-contact user motion and divides the screen into plural screens according to directivity of the input non-contact user motion if the input non-contact user motion having the directivity is recognized,
wherein the control unit divides the plural divided screens according to directivity of a following user motion if the following input non-contact user motion is recognized in a state where the screen has been divided into the plural screens.

* * * * *